United States Patent [19]

Mayrhofer

[11] Patent Number: 4,633,854

[45] Date of Patent: Jan. 6, 1987

[54] CAVITY RECEIVER FOR CONCENTRATED SOLAR RADIATION

[75] Inventor: Otto Mayrhofer, Karlsfeld, Fed. Rep. of Germany

[73] Assignee: M.A.N. Maschinenfabrik Augsburg-Nurnberg AG, Munich, Fed. Rep. of Germany

[21] Appl. No.: 802,044

[22] Filed: Nov. 26, 1985

[30] Foreign Application Priority Data

Dec. 6, 1984 [DE] Fed. Rep. of Germany ....... 3444530

[51] Int. Cl.$^4$ ................................................. F24J 2/02
[52] U.S. Cl. .................................... 126/451; 126/450; 126/417
[58] Field of Search ............... 126/451, 429, 431, 438, 126/439, 424, 417, 450; 98/36

[56] References Cited

U.S. PATENT DOCUMENTS

| | | | |
|---|---|---|---|
| 3,924,604 | 12/1975 | Anderson | 126/424 |
| 4,121,564 | 10/1978 | Schwartz | 126/438 |
| 4,263,895 | 4/1981 | Colao | 126/438 |
| 4,280,327 | 7/1981 | Mackay | 126/451 |

FOREIGN PATENT DOCUMENTS 2497930 7/1982 Fed. Rep. of Germany ...... 126/438

OTHER PUBLICATIONS

Beverly, W. D., "One Megatt (Thermal) Bench Model Solar Receiver Design and Test", Proc. of the 15th Intersociety Energy Conversion Engineering Conference, Energy to the 21st Century Section, Aug. 1980.

Primary Examiner—James C. Yeung
Attorney, Agent, or Firm—Alan H. Levine

[57] ABSTRACT

A cavity receiver having an aperture through which concentrated solar radiation enters the cavity. Holes are provided in the bottom wall of the receiver through which cold air, which enters the cavity through the aperture, can be withdrawn by an aspirator. The outlet of the aspirator can exhaust the cold air to the atmosphere, or reintroduce the air into the cavity through holes adjacent to the aperture. Holes can also be provided in the top wall of the receiver, and an aspirator used to withdraw air from the cavity through the top wall holes and reintroduce it into the cavity through the bottom wall holes.

6 Claims, 7 Drawing Figures

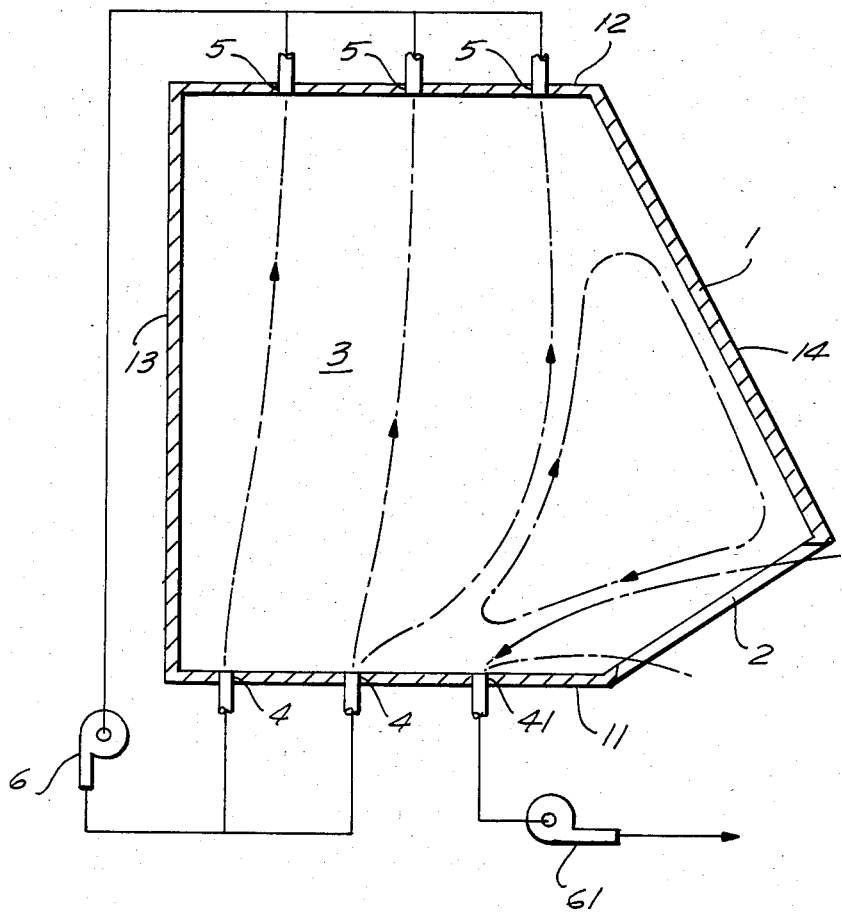

CAVITY RECEIVER FOR CONCENTRATED SOLAR RADIATION

The invention relates to a cavity receiver, in which concentrated solar radiation enters through an aperture, and in which, using a heat transfer means, a portion of the incoming energy is transferred by heating a coolant current.

Such a cavity receiver is, for example, employed as a component of a solar energy plant, operating on the so-called tower principle. The cavity receiver, which is placed in the upper part of a tower, has one or more apertures through which sunlight, as reflected and concentrated by movable mirrors mounted on the ground, is directed.

Usually, the walls of the cavity receiver give it the form of a prismatoid with a bottom and top wall. A part of the inner surface of the cavity receiver is occupied by a heat transfer means covering a large area and having a coolant flowing through it. The radiation inlet aperture of the cavity receiver is conventionally not covered over by transparent sheet material for the highly concentrated radiation to pass through, and as a result air is able to flow through the aperture. For this reason, the cavity receiver is filled with air which is in communication with the outside air through the radiation aperture.

Normally, it is not the purpose of such a solar radiation receiver to heat the air present in the cavity under atmospheric pressure, but rather to heat another coolant separated from such air by the walls of the heat transfer means. However, it is not possible, in practise, to prevent the air in the cavity from being heated.

A substantial problem, in connection with cavity receivers in solar energy plants, resides in the interaction of the two following phenomena:

Heating of the cavity air by incoming energy, and the exchange of the cavity air with the surrounding air through the radiation inlet aperture. There is an inflow of cold air from the surroundings. This flow of air through the cavity in conjunction with heating of the air leads to a loss of energy which is termed the convection loss of the receiver. In the operation of solar tower plants, this constitutes one serious loss of energy from the radiation receiver. Therefore, in planning such a plant, attempts are made, by a judicious design of the structure, to keep the convection loss as low as possible. However, this endeavor imposes certain limits on the designer inasmuch as modifications in the geometry of the receiver is not without an effect on the optical properties relevant for handling radiation. The best compromises are usually found to be those in which the inlet aperture is located in the geodatically lower part of the receiver housing.

An object of the invention is to create a radiation cavity receiver in which the thermal convection losses through the inlet aperture are minimized or avoided without impairing the optical properties of the inlet aperture by a disadvantageous configuration of the receiver.

Another object of the invention is to provide a cavity receiver in which cold air which enters the cavity through the inlet aperture can be withdrawn through holes or pores in the bottom wall of the receiver.

A more detailed description of the invention will be given now with reference to the accompanying drawings.

FIGS. 3-7 are cross-sectional views similar to FIG. 2 showing different embodiments of the invention.

Figure 1:
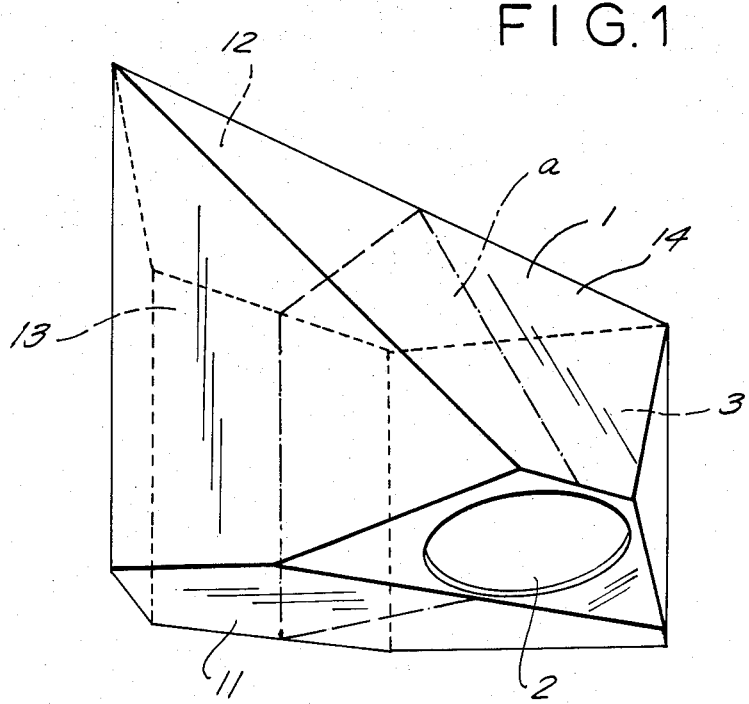
FIG. 1 is a perspective view of a cavity receiver.

FIG. 1 is a front perspective view of a cavity receiver looking obliquely upwards. The circular inlet aperture 2 appears as an ellipse. The receiver has a bilaterally symmetrical form, the vertical plane of symmetry "a" being indicated by dot-dash lines. The cavity receiver consists of a cavity 3 defined by walls 1 with an inlet aperture 2 for receiving radiation. The walls 1 may in part be cooled and in part uncooled, and cooling of the receiver for the output of energy therefrom is not by way of the air in the cavity 3.

Figure 2:
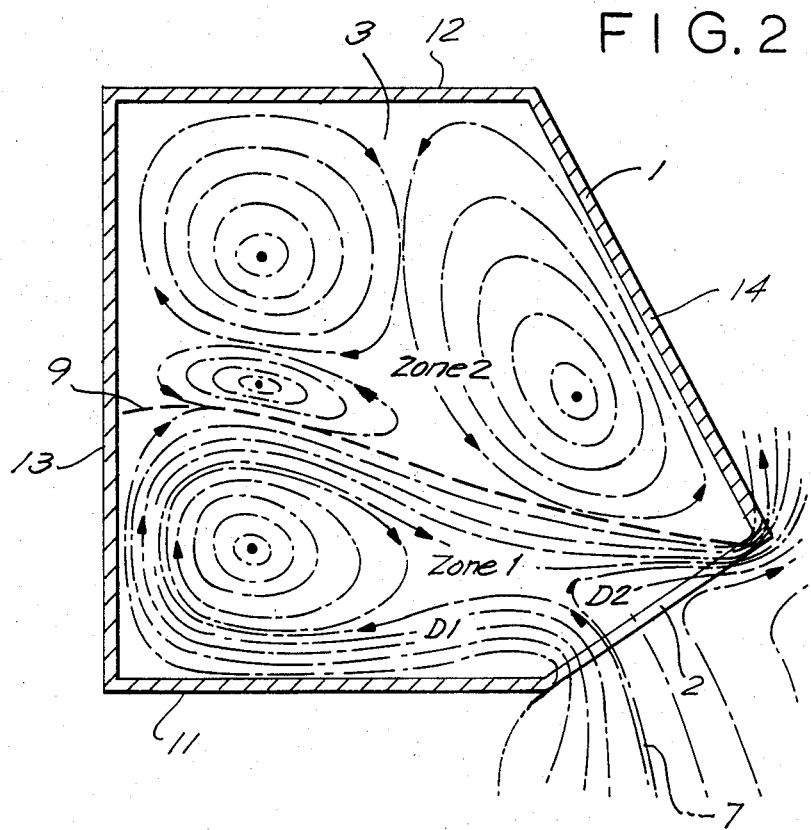
FIG. 2 is a cross-sectional view through the cavity receiver of FIG. 1 taken along its plane of symmetry.

FIG. 2 is a cross section through the receiver in the plane of symmetry. In this case, the hot walls 1 are the horizontal lower wall 11, the upright wall 13 on the left, the horizontal upper wall 12 and the oblique roof 14. On the bottom right is the radiation inlet aperture 2 in an inclined plane between the lower wall 11 and the roof 14.

The volume of the cavity 3 is divided into two zones:

Zone 1 is the lower part of the volume. The average temperature of the air is relatively low here; it is mainly controlled by the temperature of the surrounding air. In this zone there is a relatively rapid exchange of air with the surroundings.

Zone 2 is the upper part of the volume. Here the mean air temperature level is relatively high and is substantially influenced by the cavity wall temperature. There is only a limited exchange of air between this zone and the surroundings.

This division of the space into two parts is due to the low level at which the aperture is arranged. Due to the density of hot air being lower than that of the surroundings, the hot air tends to move upwards, and hence it is more difficult for it to escape from the cavity 3 through a low aperture. Because of this density gradient, the hot air in the zone 2 repels the cold air currents from the zone 1.

As a result of theoretical work, and also experimental investigations, it has been found that for zone 1 of such a cavity 3 there is, qualitatively speaking, the following flow pattern:

Air 7 drawn in through aperture 2, into the lower part of cavity 3, flows in one pass through zone 1 and then leaves cavity 3 again through the upper part of the aperture 2. As this takes place a part D1 of this air current contacts wall faces of zone 1 and the interface 9 between the two zones. The remaining part D2 of the incoming air current does not come into contact with any wall surfaces and after moving along a short length path leaves cavity 3.

The drive for the current as shown in FIG. 1 is generally at two positions:

the upthrust of the air heated in cavity 3, in relation to the surrounding air, after emerging from the cavity 3; and the upthrust of the air current near the wall heated at the upright walls of cavity 3, such current flowing through the cavity.

FIGS. 3 through 7 show various embodiments of the invention.

Figure 3:
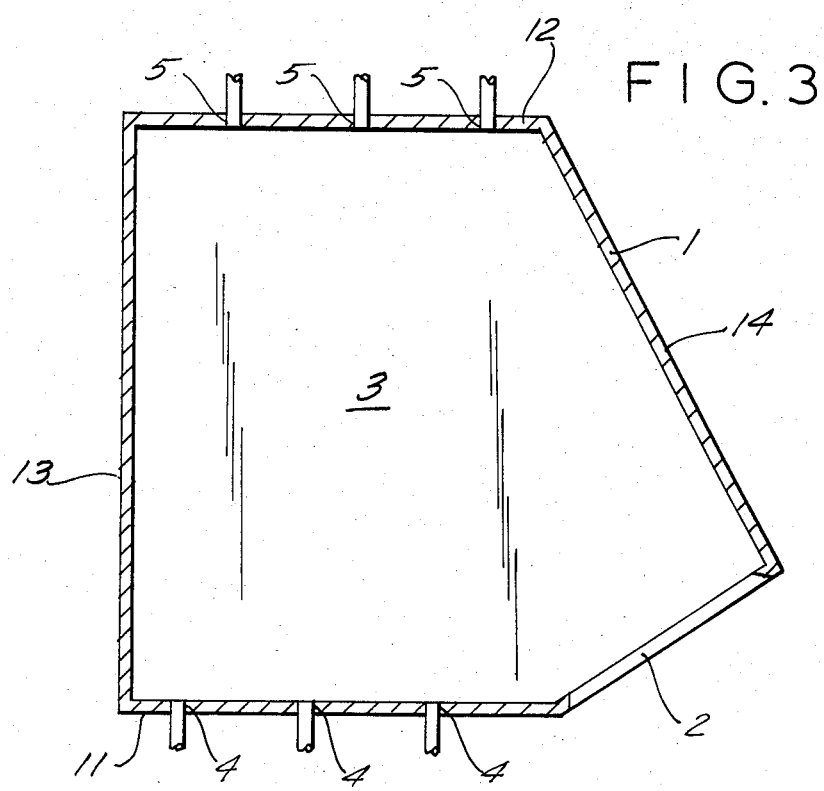

In FIG. 3, it will be seen that there are additional holes 4 and 5 provided, respectively, in the lower part (and more particularly in the lower wall 11) of the receiver, and in the upper part (more especially in the upper wall 12) of the receiver, such holes not being present in FIGS. 1 and 2. Through holes 4, air may be aspirated from the cavity or blown into it. The form of holes 4 and 5 may vary; in accordance with their suitability, it is possible to have a few large openings, a large number of small openings, or even large porous sheet structures. The openings may be concentrated in groups or arranged over large areas.

For the purpose of drawing off, or introducing, air, the openings may each by separately connected to a blower or aspirator. However, it is also possible to connect a group of openings with a blower, or to connect all the openings of the lower wall to a common blower, or all the openings of the top wall to a common blower.

Figure 4:
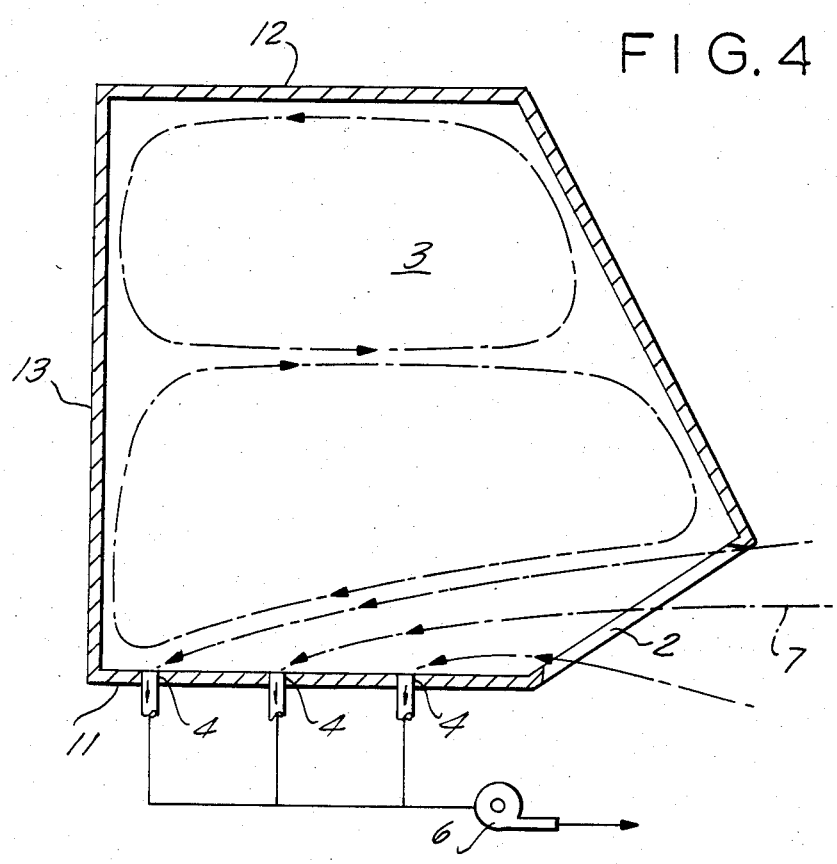

By drawing off, or by drawing off and introducing, air via the openings 4 and 5, it is possible for the flow of air through cavity 3 to be prevented, or at least greatly reduced. There is, then, a concomitant reduction in the loss due to convection. This will now be explained on the basis of two examples:

In FIG. 4, the cavity receiver as described above is so employed that the upper openings 5 are closed off or omitted altogether, whereas air is drawn off through the openings 4. the air drawn off at the lower wall 11, by means of a blower 6, is continuously replaced by the inflow of cold air 7 from the surroundings entering through the radiation inlet opening 2. On its way over the lower wall 11 of the receiver, as far as the draw-off openings 4, the air will be heated by the transfer of heat in the boundary layer. This heat is carried away by the drawn off air flow from cavity 3, and as a rule will represent a loss. It is however known that the quantity of heat transferred in the lower boundary layer to the air current is very much less than the amount of heat transferred in the boundary layer at the upright walls, as in FIG. 2. The remaining convection loss is, therefore, only a very small fraction of the loss resulting if there were no aspiration of air at the lower wall of the cavity.

Such drawing off of air from the bottom of the cavity involves the drawing off of hardly any hot air from the top cavity zone, since the hot air remains on top of the cold air current (which extends from the radiation inlet opening 2) due to the lower density of the hot air. The consumption of energy for the operation of the aspiration blower 6 is very small in comparison with the gain in energy due to the suppression of the air flow through the cavity which is indicated in FIG. 2. The air draw-off system, with the blower 6, may be so constructed that the masses flowing off through the individual aspiration openings 4 are different in size and may be selected by control means (such as butterfly valves). As a result the efficiency of the system may be optimized. The technology of the system is simplified by the fact that the air temperatures in the draw-off system are low.

Figure 5:
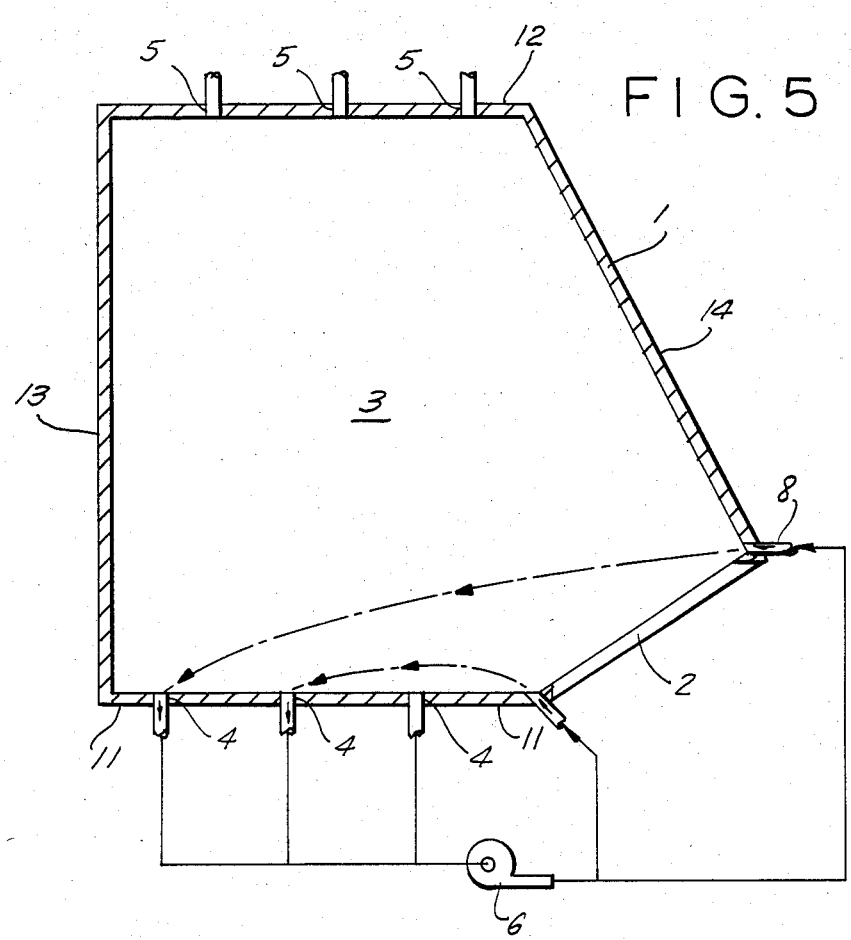

In FIG. 5, the air aspirated at the lower wall 11 is blown in again (after passing through the blower 6) at a point 8 near the radiation inlet opening 2. Consequently, it is possible to produce a generally forced recirculation of the air. A circulation of air, however, also means a circulation of energy. The loss due to convection in the receiver may accordingly, in some cases, be further reduced.

Figure 6:
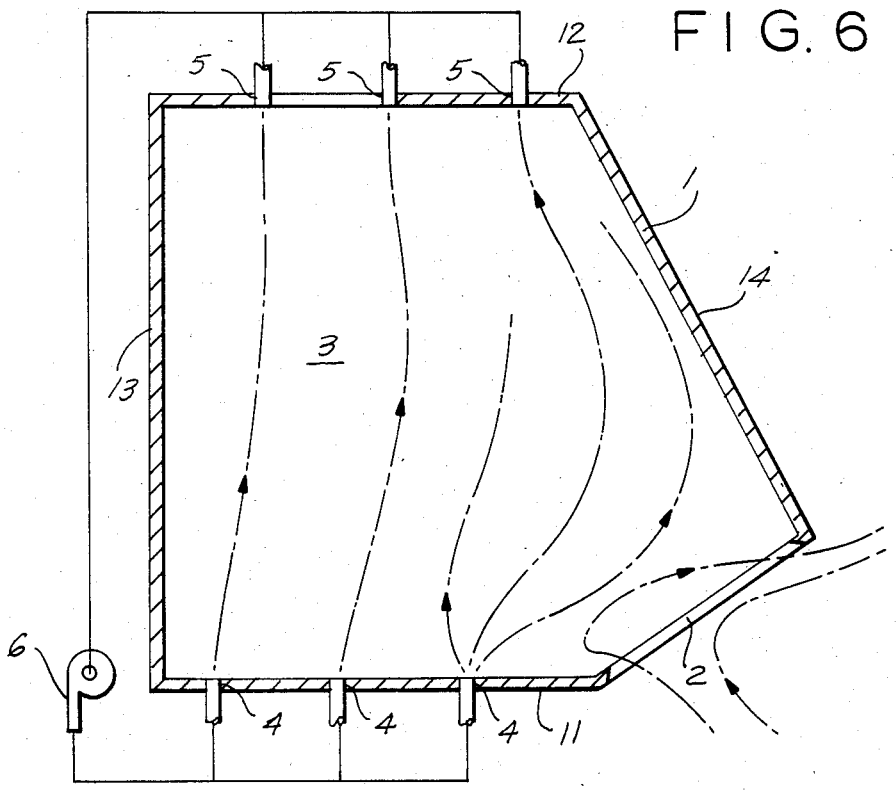

A further way of tackling this problem is by the provision of a combined use of air openings in the lower wall 11 and in the upper wall 12 of the receiver (see FIG. 6). In this case very hot air is drawn off from the cavity 3, by way of the openings 5, and is blown in again through the openings 4 in the lower wall. This circulation takes place with a small flow just sufficient to achieve the desired purpose. The purpose of injecting air at the bottom is to prevent a layer of relatively cold air being formed on the lower wall of the cavity. Since the cold air 7, due to its relatively high density, is not moved upwards, it is possible for the inner walls of the cavity 3 to be generally kept out of contact with cold air. In the case of this construction, care should be taken to see that the forced hot air flow in cavity 3 does not move at excessively high speeds, as there would otherwise be a danger of a pronounced mixing with the cold air in the vicinity of inlet aperture 2. For optimizing the system it is, in this case, again possible to make a suitable choice of the injection and drawing off openings and the distribution of the flow among the openings.

Lastly, it is possible to form a combination of this last-described hot air circuit with the cold air aspiration system in the vicinity of the radiation inlet aperture, described hereinbefore, if this should prove to be advantageous. An example of this is to be seen in FIG. 7, in which an additional blower 61 also draws off cold air through a hole 41 in the vicinity of the inlet aperture.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A cavity receiver comprising a plurality of interconnected walls defining an enclosed cavity, an aperture in the lower part of the receiver through which concentrated solar radiation can enter the cavity to heat air occupying the upper region of the cavity, at least one hole in a cavity wall at the lower part of the receiver, and means for withdrawing air from the cavity through the hole so as to create a flow of air through the lower part of the cavity from the aperture to the hole, said air flow remaining substantially entirely within the lower part of the cavity so that it remains relatively cold and separates the heated air in the upper region of the cavity from the aperture.

2. A cavity receiver as defined in claim 1 wherein the walls of the receiver include a bottom wall, and the means for drawing cold air out of the cavity includes holes in the bottom wall.

3. A cavity receiver as defined in claim 2 wherein the means for drawing cold air out of the cavity includes an aspirator connected to the holes in the bottom wall.

4. A cavity receiver as defined in claim 3 wherein the aspirator has an outlet opening into the atmosphere.

5. A cavity receiver as defined in claim 3 wherein the aspirator has an outlet opening, and including holes in the receiver adjacent to the aperture, and means connecting the outlet of the aspirator to the holes adjacent to the aperture.

6. A cavity receiver as defined in claim 1 wherein the walls of the receiver include a top wall having holes and a bottom wall having holes, and including aspirator means for withdrawing air within the cavity through the holes in the top wall and reintroducing that air into the cavity through the holes in the bottom wall.

* * * * *